(12) United States Patent
Cho

(10) Patent No.: US 12,365,321 B2
(45) Date of Patent: Jul. 22, 2025

(54) ELECTRONIC BRAKE SYSTEM AND CONTROL METHOD THEREOF

(71) Applicant: HL MANDO CORPORATION, Pyeongtaek-si (KR)

(72) Inventor: Kyungran Cho, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 101 days.

(21) Appl. No.: 18/142,663

(22) Filed: May 3, 2023

(65) Prior Publication Data

US 2023/0356701 A1   Nov. 9, 2023

(30) Foreign Application Priority Data

May 4, 2022   (KR) .................... 10-2022-0055491

(51) Int. Cl.
  *B60T 8/88*   (2006.01)
  *B60T 8/92*   (2006.01)
  *B60T 13/74*   (2006.01)
  *B60T 17/22*   (2006.01)

(52) U.S. Cl.
  CPC ............... *B60T 8/885* (2013.01); *B60T 8/92* (2013.01); *B60T 13/74* (2013.01); *B60T 17/22* (2013.01); *B60T 2220/04* (2013.01); *B60T 2240/00* (2013.01); *B60T 2270/402* (2013.01); *B60T 2270/403* (2013.01); *B60T 2270/404* (2013.01); *B60T 2270/406* (2013.01); *B60T 2270/413* (2013.01); *B60T 2270/414* (2013.01); *B60T 2270/82* (2013.01)

(58) Field of Classification Search
  CPC .. B60W 30/045; B60W 10/184; B60W 10/20; B60W 2510/20; B60W 2520/14; B60W 2710/18; B60T 8/1766; B60T 8/1755; B60T 8/17551
  See application file for complete search history.

(56) References Cited

U.S. PATENT DOCUMENTS

2008/0234908 A1* 9/2008 St. Clair ............... F16D 57/002
  701/70
2012/0185125 A1* 7/2012 Kitagawa ............... G07C 5/085
  701/32.7

(Continued)

FOREIGN PATENT DOCUMENTS

WO   WO-2020246867 A1 * 12/2020 ............. B60T 13/74
WO   WO-2021145335 A1 * 7/2021 ............. B60K 23/04
WO   WO-2023092347 A1 * 6/2023 ............. B60T 1/00

*Primary Examiner* — Joseph J Dallo
(74) *Attorney, Agent, or Firm* — Harvest IP Law, LLP

(57) ABSTRACT

An electronic brake system according to an embodiment of the present disclosure includes a first pedal travel sensor and a second pedal travel sensor each including two internal sensors and outputting a pedal detection signal according to an operation of a brake pedal; and a first ECU (electronic control unit) may receive a first pedal detection signal from a first internal sensor of the first pedal travel sensor and receive a second pedal detection signal from a second internal sensor of the second pedal travel sensor, and a second ECU may receive a third pedal detection signal from a third internal sensor of the first pedal travel sensor and receive a fourth pedal detection signal from a fourth internal sensor of the second pedal travel sensor.

20 Claims, 5 Drawing Sheets

(56) References Cited

U.S. PATENT DOCUMENTS

| | | | | |
|---|---|---|---|---|
| 2012/0310472 | A1* | 12/2012 | Prokhorov | B60W 50/10 |
| | | | | 701/32.2 |
| 2018/0236876 | A1* | 8/2018 | Isono | B60T 13/746 |
| 2021/0394728 | A1* | 12/2021 | Yoo | B60T 8/4081 |
| 2022/0315022 | A1* | 10/2022 | Yoshikawa | G07C 5/02 |
| 2022/0411014 | A1* | 12/2022 | Meadows | B62M 3/086 |

* cited by examiner

ELECTRONIC BRAKE SYSTEM AND CONTROL METHOD THEREOF

REFERENCE TO RELATED APPLICATION

The present application claims priority to Korean Patent Application No. 10-2022-0055491, filed May 4, 2022, the entire contents of which is incorporated herein for all purposes by this reference.

BACKGROUND

1. Field of the Invention

The present disclosure relates to an electronic brake system and a control method thereof.

2. Discussion of Related Art

Recently released vehicles are provided with an electronic brake system that electronically controls driving of a brake according to an operation of a pedal.

When a driver steps on a brake pedal, such an electronic brake system receives the driver's will to brake as an electrical signal from a pedal travel sensor (PTS) that detects the displacement of the brake pedal.

The pedal travel sensor detects a degree of motion of the brake pedal so as to measure a stroke of the brake pedal when a pedal effort is generated on the brake pedal. The electronic brake system generates a braking pressure through a hydraulic pressure and a control signal proportional to the measured stroke, and controls a wheel speed according to the generated braking pressure.

As such, since many parts of the electronic brake system are made up of electronic equipment, various techniques for implementing redundancy of an electronic parking brake system have been proposed to increase reliability of an operation of the system or an operation of components constituting the brake system.

SUMMARY OF THE INVENTION

The present disclosure is directed to providing an electronic brake system that more efficiently secures reliability of a pedal travel sensor.

The present disclosure is directed to providing an electronic parking brake system that not only implements redundancy for an ECU, but also secures redundancy for a pedal travel sensor and is thus more stable.

An electronic brake system according to an embodiment of the present disclosure may comprise a first pedal travel sensor and a second pedal travel sensor each comprising two internal sensors and outputting a pedal detection signal according to an operation of a brake pedal; and a first ECU (electronic control unit) and a second ECU connected to the first pedal travel sensor and the second pedal travel sensor and controlling an electronic parking brake according to the pedal detection signal, wherein the first ECU may receive a first pedal detection signal from a first internal sensor of the first pedal travel sensor and receive a second pedal detection signal from a second internal sensor of the second pedal travel sensor, and the second ECU may receive a third pedal detection signal from a third internal sensor of the first pedal travel sensor and receive a fourth pedal detection signal from a fourth internal sensor of the second pedal travel sensor.

The first ECU may further include at least one first regulator configured to supply a constant first power to the first internal sensor and the second internal sensor; and a first MCU (Microcontroller Unit) configured to receive the first pedal detection signal and the second pedal detection signal respectively from the first internal sensor and the second internal sensor, and the second ECU may further include at least one second regulator configured to supply a constant second power to the third internal sensor and the fourth internal sensor; and a second MCU configured to receive the third pedal detection signal and the fourth pedal detection signal respectively from the third internal sensor and the fourth internal sensor.

The electronic brake system may further include a plurality of motors connected to the first ECU and the second ECU and providing driving force to calipers, wherein the first ECU may control the plurality of motors by using the first pedal detection signal and the second pedal detection signal when an operation state of the first ECU is in an active state.

The second ECU may control the plurality of motors by using the third pedal detection signal and the fourth pedal detection signal when an operation state of the first ECU is in an inactive state.

The second ECU may receive information about an operation state of the first ECU from the first ECU and identify an operation state of the first ECU based on the information about the operation state of the first ECU.

The first ECU may compare the first pedal detection signal and the second pedal detection signal to determine whether any one of the first internal sensor and the second internal sensor has an error when an operation state of the first ECU is in an active state.

The first ECU may receive the third pedal detection signal and the fourth pedal detection signal from the second ECU to determine again whether there is an error when it is determined that the any one of the first internal sensor and the second internal sensor has the error.

The second ECU may compare the third pedal detection signal and the fourth pedal detection signal to determine whether any one of the third internal sensor and the fourth internal sensor has an error when an operation state of the first ECU is in an inactive state.

The second ECU may receive data from a wheel speed sensor to determine again whether there is an error when the any one of the third internal sensor and the fourth internal sensor has the error.

At least one of the first pedal travel sensor and the second pedal travel sensor may be an internal pedal travel sensor.

A method for controlling an electronic brake system according to an embodiment of the present disclosure includes; receiving, by a first ECU (electronic control unit), a first pedal detection signal from a first internal sensor of a first pedal travel sensor and a second pedal detection signal from a second internal sensor of a second pedal travel sensor according to an operation of a brake pedal; receiving, by a second ECU, a third pedal detection signal from a third internal sensor of the first pedal travel sensor and a fourth pedal detection signal from a fourth internal sensor of the second pedal travel sensor according to the operation of the brake pedal; and controlling, by the first ECU or the second ECU, a plurality of motors providing driving force to calipers, based on an operation state of the first ECU.

The controlling a plurality of motors may include receiving, by the second ECU, information about an operation state of the first ECU from the first ECU; and identifying, by the second ECU, an operation state of the first ECU based on the information about the operation state of the first ECU.

The controlling a plurality of motors may include controlling, by the first ECU, the plurality of motors by using the first pedal detection signal and the second pedal detection signal when an operation state of the first ECU is in an active state.

The controlling a plurality of motors may include controlling, by the second ECU, the plurality of motors by using the third pedal detection signal and the fourth pedal detection signal when an operation state of the first ECU is in an inactive state.

The controlling a plurality of motors may include comparing, by the first ECU, the first pedal detection signal and the second pedal detection signal to determine whether any one of the first internal sensor and the second internal sensor has an error when an operation state of the first ECU is in an active state.

The method for controlling may further include receiving, the first ECU, the third pedal detection signal and the fourth pedal detection signal from the second ECU to determine again whether there is an error when it is determined that the any one of the first internal sensor and the second internal sensor has an error.

The controlling a plurality of motors may include comparing, by the second ECU, the third pedal detection signal and the fourth pedal detection signal to determine whether any one of the third internal sensor and the fourth internal sensor has an error when an operation state of the first ECU is in an inactive state.

In the method for controlling, at least one of the first pedal travel sensor and the second pedal travel sensor may be an internal pedal travel sensor.

A recording medium on which a computer readable program is stored, the program comprising a code for performing a method for controlling an electronic brake system, the method for controlling an electronic brake system including: receiving, by a first ECU (electronic control unit), a first pedal detection signal from a first internal sensor of a first pedal travel sensor and a second pedal detection signal from a second internal sensor of a second pedal travel sensor according to an operation of a brake pedal; receiving, by a second ECU, a third pedal detection signal from a third internal sensor of the first pedal travel sensor and a fourth pedal detection signal from a fourth internal sensor of the second pedal travel sensor according to the operation of the brake pedal; and controlling, by the first ECU or the second ECU, a plurality of motors providing driving force to calipers, based on an operation state of the first ECU.

According to an embodiment of the present disclosure, since each ECU receives a signal from an internal sensor built in a different pedal sensor, it is possible to implement an efficient and highly reliable signal reception scheme by securing redundancy of the pedal travel sensor together with securing redundancy of the ECU.

According to an embodiment of the present disclosure, an electronic brake system capable of more stable driving control can be provided by securing redundancy of the pedal travel sensor together with securing redundancy of the ECU.

According to an embodiment of the present disclosure, even if there is no exchange of pedal detection signals between the ECUs, it is possible to determine the validity of data, and since the amount of data transmission is significantly reduced, costs can be reduced.

DETAILED DESCRIPTION OF EXEMPLARY EMBODIMENTS

Figure 1:
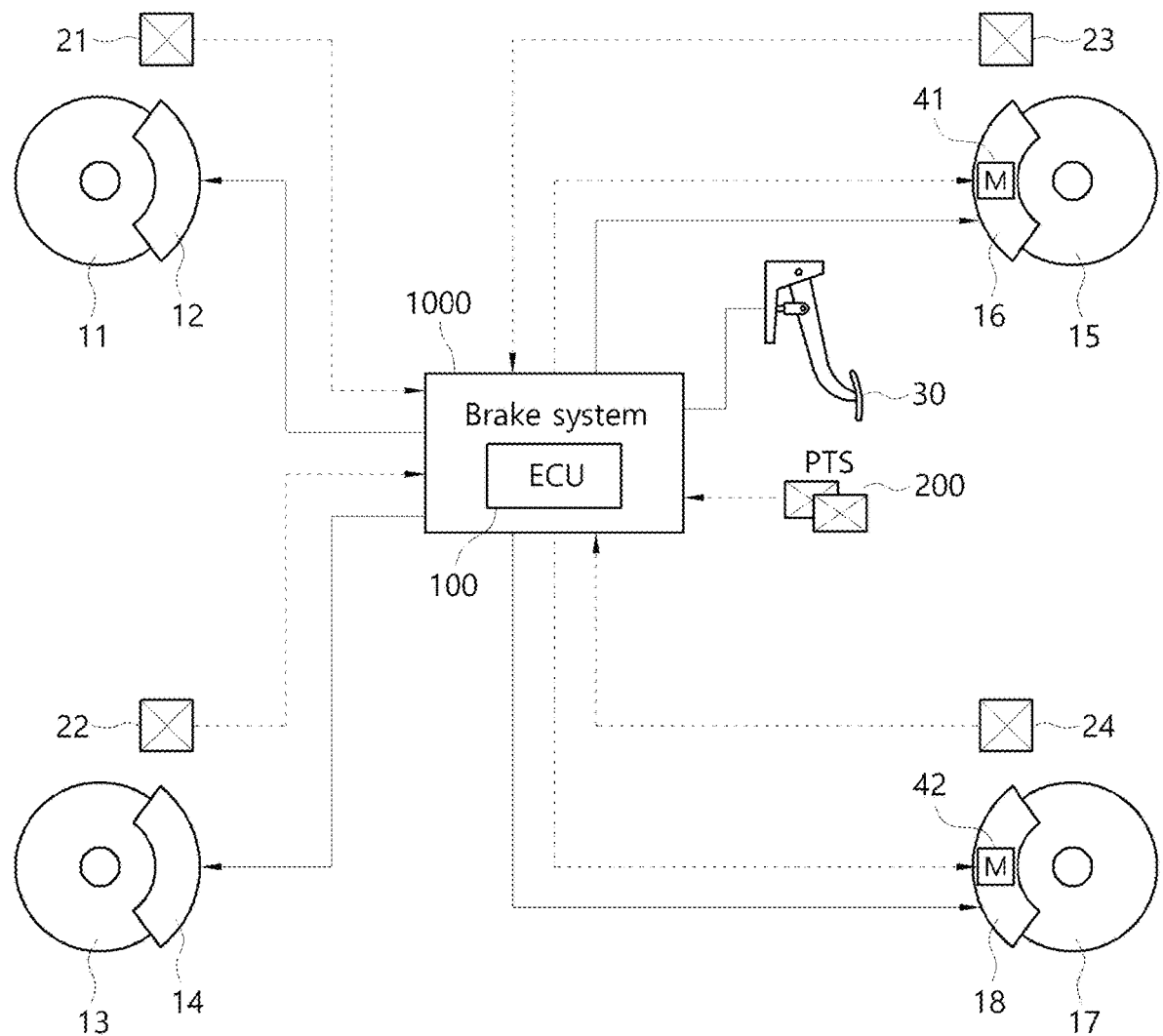
FIG. 1 is a diagram showing a schematic structure of an electronic brake system according to an exemplary embodiment of the present disclosure.

Hereinafter, preferred embodiments according to the present disclosure will be described in detail with reference to the accompanying drawings. The detailed description to be disclosed hereinafter with the accompanying drawings is intended to describe exemplary embodiments of the present disclosure and is not intended to represent the only embodiments in which the present disclosure may be implemented. In the drawings, parts unrelated to the description may be omitted for clarity of description of the present disclosure, and like reference numerals may designate like elements throughout the specification. In addition, in the embodiment of the present disclosure, terms including ordinal numbers such as first and second are used only for the purpose of distinguishing one component from another, and expressions in the singular include plural expressions unless the context clearly indicates otherwise.

FIG. 1 is a diagram showing a schematic structure of an electronic brake system according to an exemplary embodiment of the present disclosure.

Referring to FIG. 1, the electronic brake system largely includes a brake pedal 30; brake discs 11, 13, 15, and 17 of a vehicle; calipers 12, 14, 16, and 18 that apply braking force to each brake disc 11, 13, 15, and 17; wheel speed sensors (WSS) 21, 22, 23, and 24 that check the rotation speed of each brake disc 11, 13, 15, and 17; a plurality of pedal travel sensors 200 that detect a degree of movement of the brake pedal 30 when a pedal effort is generated on the brake pedal 30; motors 41 and 42 that provide driving force to the calipers 16 and 18; and a brake system 1000 including an electronic control unit (ECU) 100 that receives sensor data from various sensors such as the wheel speed sensors 21, 22, 23, 24 and the pedal travel sensors 200 and controls the electronic brake system based on the received sensor data.

According to an embodiment of the present disclosure, when a pedal effort is generated on the brake pedal 30 according to a driver's will to brake, the plurality of pedal travel sensors 200 detect a degree of movement of the brake pedal 30 and output a pedal detection signal. According to an embodiment of the present disclosure, the plurality of pedal travel sensors 200 transmit the pedal detection signal to the ECU 100 of the brake system 1000, and the ECU 100 controls the motors 41 and 42 according to the pedal detection signal.

More specifically, the ECU 100 measures a stroke through the pedal detection signal received from the pedal travel sensor 200, and provides a hydraulic pressure proportional to the measured stroke to the motor to control a wheel speed according to a braking pressure generated. In this case, the ECU 100 may determine a wheel speed by using the wheel speed detection signal received from the wheel speed sensors 21, 22, 23, and 24 to perform appropriate motor control.

According to an embodiment of the present disclosure, the electronic brake system uses a plurality of pedal travel sensors 200. In the case of using a plurality of pedal travel sensors 200, reliability of the electronic brake system may be increased compared to the case of using one pedal travel sensor. More specifically, the ECU 100 compares the plurality of pedal detection signals received from the plurality of pedal travel sensors 200 to check whether the pedal travel sensors 200 are abnormal, whether the received pedal detection signals are abnormal, and the like, thereby increasing reliability of brake control.

In addition, according to an embodiment of the present disclosure, the electronic brake system uses a plurality of ECUs 100 to secure redundancy of the ECUs. In this case, when a pedal detection signal is transmitted from the plurality of pedal travel sensors to each ECU, if an error occurs in one ECU or in one pedal travel sensor, it may be the same as using one pedal travel sensor again.

Therefore, the electronic brake system according to the present disclosure provides a method of implementing an efficient and highly reliable signal reception scheme by modifying a signal line for receiving a pedal detection signal from the plurality of pedal travel sensors 200 in order to secure redundancy of the pedal travel sensor together with securing the redundancy of the ECU.

Hereinafter, embodiments capable of implementing redundancy of an electronic brake system in order to increase reliability of an operation of the electronic brake system will be described in detail with reference to the drawings. In this case, when describing the electronic brake system of the present disclosure, reference numerals in FIG. 1 are cited as necessary.

Figure 2:
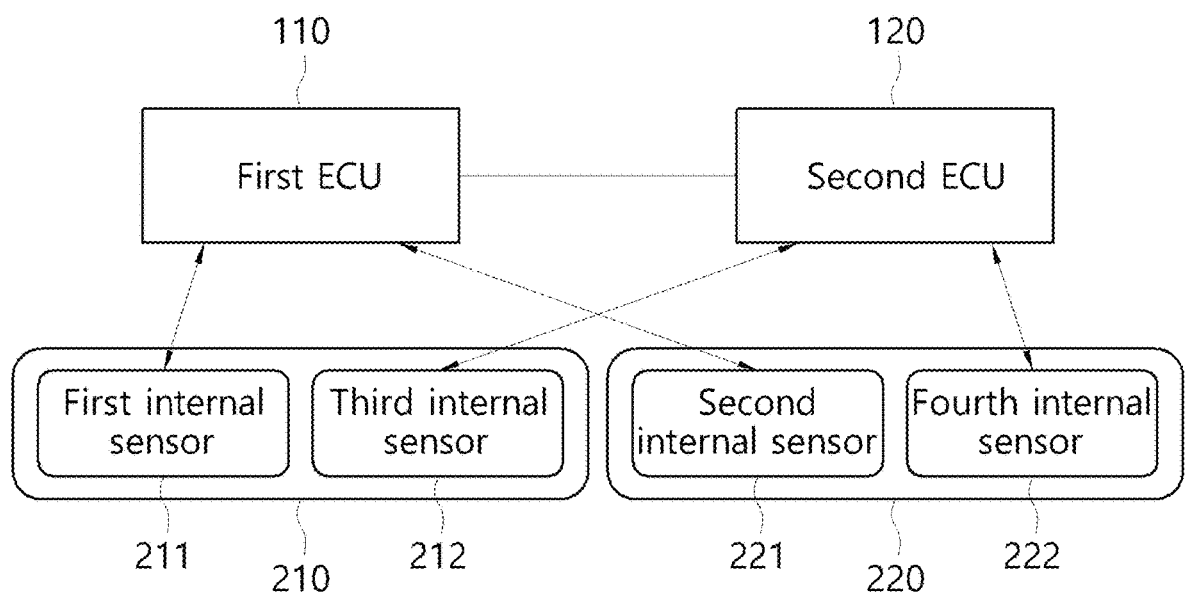
FIG. 2 is a diagram showing a schematic configuration of an electronic brake system according to an exemplary embodiment of the present disclosure.

FIG. 2 is a diagram showing a schematic configuration of an electronic brake system according to an exemplary embodiment of the present disclosure.

Referring to FIG. 2, the ECU 100 illustrated in FIG. 1 includes a first ECU 110 that is a main ECU and a second ECU 120 that is a sub ECU for implementing redundancy of the electronic brake system. In this case, the first ECU 110 and the second ECU 120 may be implemented separately from each other, and may be implemented together in one box, and are not limited to either one.

According to an embodiment of the present disclosure, when the operation state is in an active state, the first ECU 110 controls the plurality of motors 41 and 42 by using the pedal detection signals received from the plurality of pedal travel sensors 200. On the other hand, when the operation state of the first ECU 110 is in an inactive state, the second ECU 120 controls the plurality of motors 41 and 42 by using the pedal detection signals received from the plurality of pedal travel sensors 200.

Hereinafter, in the present disclosure, the operation state of the first ECU 110 will be described by dividing largely into an active state and an inactive state. In particular, the inactive state is a state in which the first ECU 110 fails to normally perform control of the electronic brake system, and includes an error in any one of internal configurations of the first ECU 110, a communication error, a problem in a battery that supplies power to the first ECU 110, and the like.

The second ECU 120 may receive information about the operation state of the first ECU 110 from the first ECU 110 and identify the operation state of the first ECU based on the information about the operation state of the first ECU 110. In this case, the information about the operation state may include an alive signal as information about whether the first ECU 110 is in an inactive state.

According to an embodiment of the present disclosure, the plurality of pedal travel sensors 200 include a first pedal travel sensor 210 and a second pedal travel sensor 220, and each pedal travel sensor includes two internal(embedded) sensors. The two internal sensors are implemented by the same two circuits in the pedal travel sensor, and the two circuits receive power and output two pedal detection signals, respectively. That is, according to an embodiment of the present disclosure, a pedal detection signal is received by four different pedal travel sensors, and two of them are transmitted to the first ECU 110 and the second ECU 120, respectively.

According to an embodiment of the present disclosure, the first ECU 110 and the second ECU 120 may compare the received outputs generated from the two circuits, respectively, to secure reliability of the pedal travel sensors, and may detect a failure.

In this case, how the pedal detection signal generated from the four internal sensors is transmitted to the first ECU 110 and the second ECU 120 may affect securing the reliability of the pedal travel sensors.

For example, the two internal sensors have a common mechanism structure in one pedal travel sensor. Therefore, since a specific error may occur in the two internal sensors together, it is difficult to determine the validity of the data only by comparing the internal sensor data having the common mechanism structure. If the pedal detection signal output from the two internal sensors having the common mechanism structure is transmitted to only one ECU, the ECU needs to receive the pedal detection signal received by another ECU and compare the received data to determine the validity of the data, and thus a communication circuit may be additionally provided or amount of communication data may be increased, thereby adding costs.

Therefore, the present disclosure devises a signal transmission scheme for transmitting it divided into two ECUs in preparation for an abnormal operation of the pedal travel sensors.

According to an embodiment of the present disclosure, the first ECU 110 receives a first pedal detection signal from a first internal sensor 211 of the first pedal travel sensor 210 and receives a second pedal detection signal from a second internal sensor 221 of the second pedal travel sensor 220.

Then, the second ECU 120 receives a third pedal detection signal from a third internal sensor 212 of the first pedal travel sensor 210 and receives a fourth pedal detection signal from a fourth internal sensor 222 of the second pedal travel sensor 220.

According to an embodiment of the present disclosure, when the operation state is in an active state, the first ECU 110 may control the plurality of motors 41 and 42 by using the first pedal detection signal and the second pedal detection signal. The first ECU 110 may determine the degree of movement of the pedal through the first pedal detection signal and the second pedal detection signal, and control the plurality of motors 41 and 42 to have a wheel speed corresponding to the determined amount.

According to an embodiment of the present disclosure, the first ECU 110 may compare the first pedal detection signal and the second pedal detection signal to determine whether any one of the first internal sensor 211 and the second internal sensor 221 has an error.

More specifically, if the degree of movement of the pedal determined through the first pedal detection signal and the second pedal detection signal and the degree of braking required are different, the first ECU 110 may identify that an error has occurred in any one of the first internal sensor 211 and the second internal sensor 221. In this case, when it is identified that an error has occurred, the first ECU 110 may receive data from sensors related to wheel speed, such as the wheel speed sensors 21, 22, 23, and 24 for determining a situation, or may notify the user or the manager through a notification or the like. Alternatively, the first ECU 110 may receive the third pedal detection signal and the fourth pedal detection signal received by the second ECU 120 by communicatively connecting with the second ECU 120 through a data bus, and may determine again whether an error has occurred and whether the pedal detection signal has been used.

Similarly, when the operation state of the first ECU 110 is in an inactive state, the second ECU 120 may control the plurality of motors 41 and 42 by using the third pedal detection signal and the fourth pedal detection signal. The second ECU 120 may determine the degree of movement of the pedal through the third pedal detection signal and the fourth pedal detection signal, and control the plurality of motors 41 and 42 to have a wheel speed corresponding to the determined amount.

The second ECU 120 may compare the third pedal detection signal and the fourth pedal detection signal to determine whether any one of the third internal sensor 212 and the fourth internal sensor 222 has an error.

More specifically, if the degree of movement of the pedal determined through the third pedal detection signal and the fourth pedal detection signal and the degree of braking required are different, the second ECU 120 may identify that an error has occurred in any one of the third internal sensor 212 and the fourth internal sensor 222. In this case, when it is identified that an error has occurred, the second ECU 120 may receive data from sensors related to wheel speed, such as the wheel speed sensors 21, 22, 23, and 24 for determining a situation, or may notify the user or the manager through a notification or the like. When it is identified that an error has occurred, the second ECU may receive data from the wheel speed sensor to check again whether an error has occurred.

According to an embodiment of the present disclosure, since each ECU receives a signal from an internal sensor built in a different pedal sensor, it is possible to implement an efficient and highly reliable signal reception scheme by securing redundancy of the pedal travel sensor 200 together with securing redundancy of the ECU 100.

According to an embodiment of the present disclosure, an electronic brake system capable of more stable driving control may be provided by securing redundancy of the pedal travel sensor 200 together with securing redundancy of the ECU 100.

According to an embodiment of the present disclosure, even if there is no exchange of pedal detection signals between the ECUs 100, it is possible to determine the validity of data, and since the amount of data transmission is significantly reduced, costs can be reduced.

Figure 3:
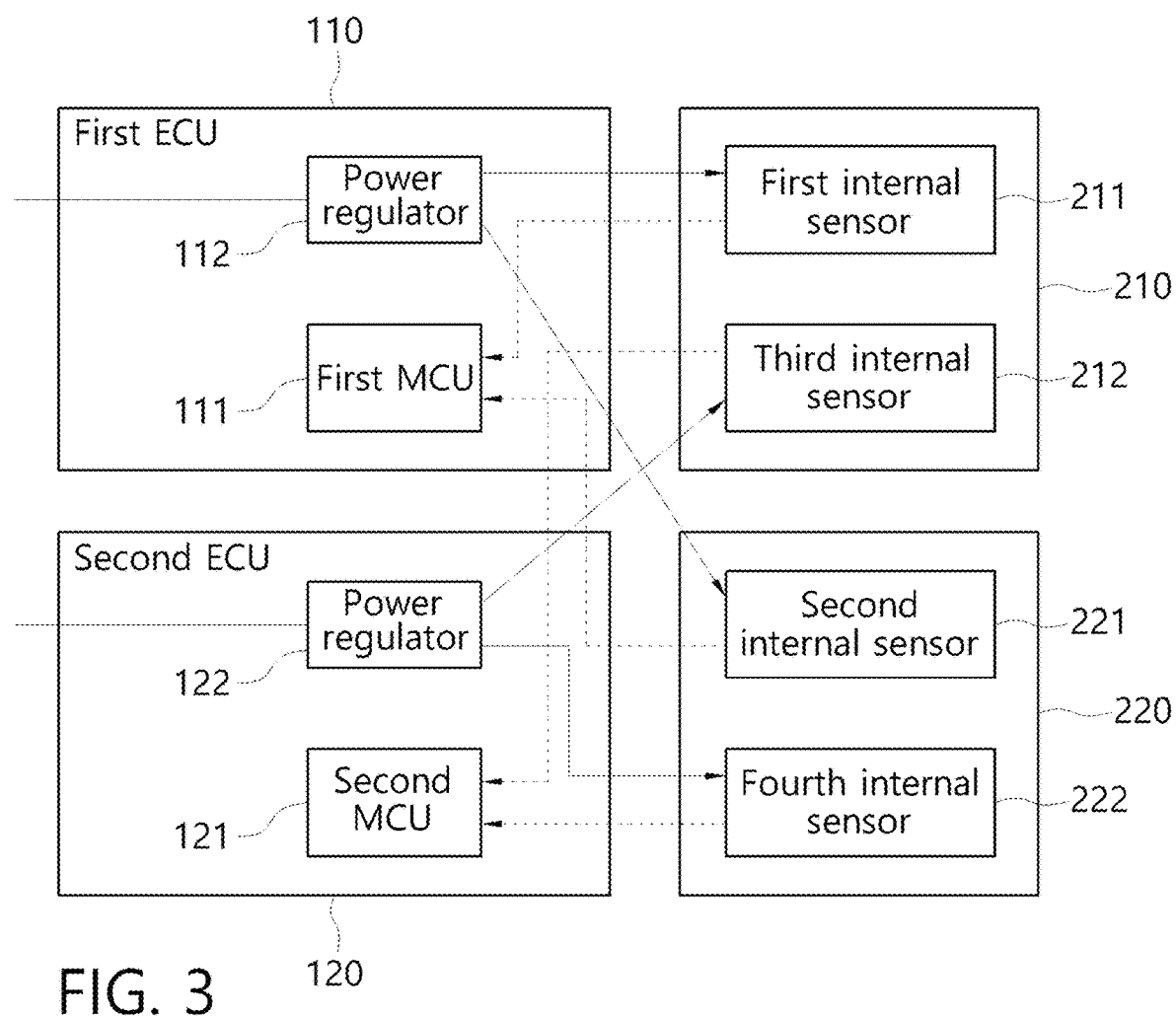
FIG. 3 is a diagram showing a specific configuration of an electronic brake system according to a first embodiment of the present disclosure.

FIG. 3 is a diagram showing a specific configuration of an electronic brake system according to a first embodiment of the present disclosure.

According to an embodiment of the present disclosure, the first ECU 110 may include a first MCU 111 and a first regulator 112.

According to an embodiment of the present disclosure, the first MCU 111 may control the overall electronic brake system such as receiving a first pedal detection signal and a second pedal detection signal from the first internal sensor 211 and the second internal sensor 221, determining a degree of movement of the pedal according to the received pedal detection signals, and controlling the plurality of motors 41 and 42 to have a wheel speed corresponding to the determined amount. In this case, although not illustrated in FIG. 3, the operation of the first MCU 111 may be performed by adding a motor driver IC, an ASIC for managing power input from a battery, a PMIC, and the like.

The first regulator 112 according to an embodiment of the present disclosure is a power regulator for supplying a constant first power to the first internal sensor 211 and the second internal sensor 221. The power regulator of the present disclosure serves to receive power from a battery and supply a predetermined power to each internal sensor, and may be applied without limitation, such as a linear regulator and a switching regulator.

According to an embodiment of the present disclosure, the second ECU 120 may include a second MCU 121 and a second regulator 122. The basic operations of the second MCU 121 and the second regulator 122 are the same as the first MCU 111 and the first regulator 112 described above.

The second MCU 121 may control the overall electronic brake system such as receiving a third pedal detection signal and a fourth pedal detection signal from the third internal sensor 212 and the fourth internal sensor 222, determining a degree of movement of the pedal according to the received pedal detection signals, and controlling the plurality of motors 41 and 42 to have a wheel speed corresponding to the determined amount. However, the second MCU 121 performs control of the electronic brake system when the second ECU 120 is in an active state based on the first ECU 110 being in an inactive state. In this case, even when the first ECU 110 is in an active state, the second MCU 121 may transmit the third pedal detection signal and the fourth pedal detection signal received from the third internal sensor 212 and the fourth internal sensor 222 or data determined based on the third pedal detection signal and the fourth pedal detection signal to the first ECU 110 according to a request of the first ECU 110.

The second regulator 122 supplies a constant second power to the third internal sensor 212 and the fourth internal sensor 222.

According to an embodiment of the present disclosure, it is possible to stably supply constant power to the internal sensor through the power regulator.

Figure 4:
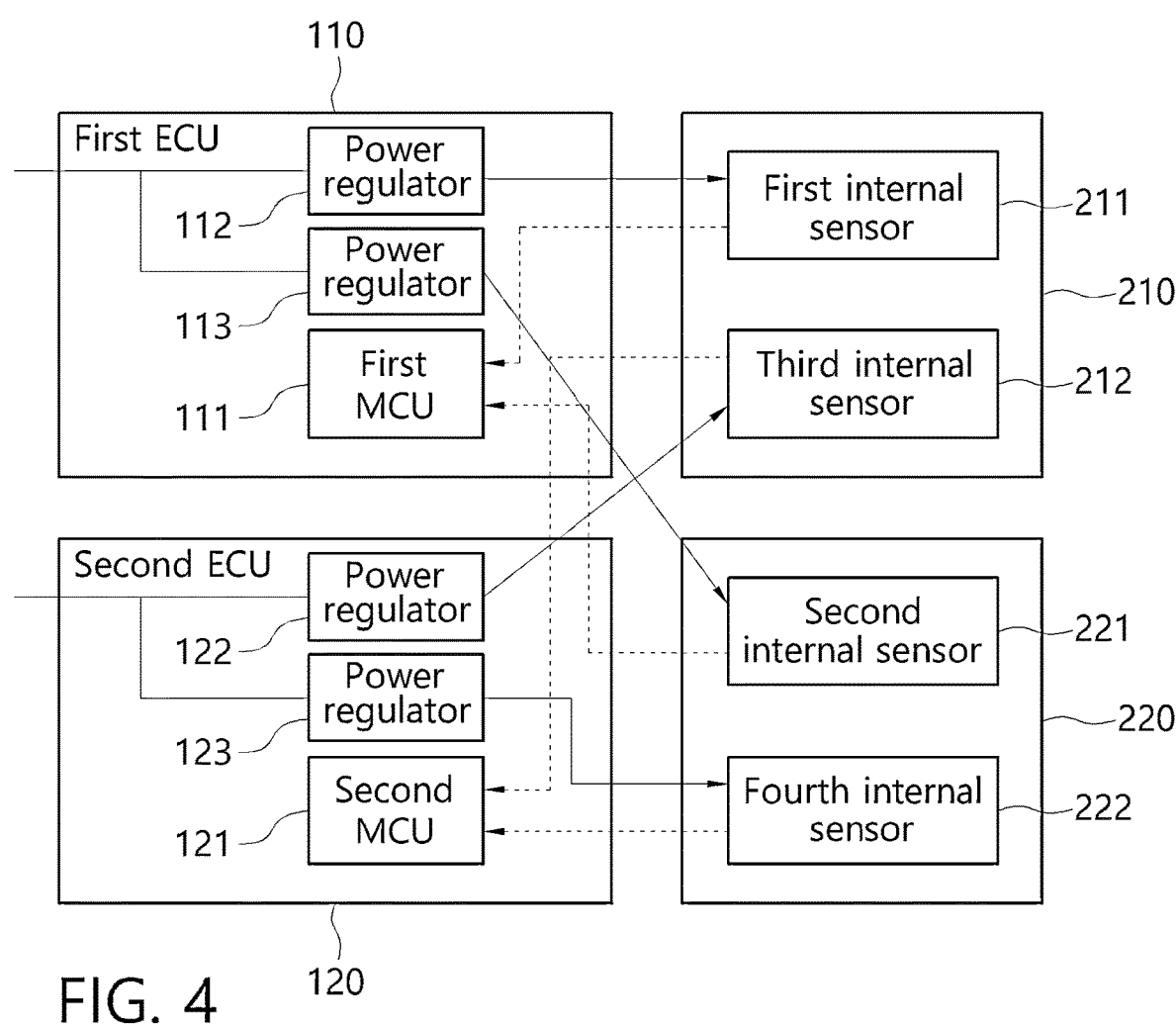
FIG. 4 is a diagram showing a specific configuration of an electronic brake system according to a second embodiment of the present disclosure.

FIG. 4 is a diagram showing a specific configuration of an electronic brake system according to a second embodiment of the present disclosure.

The electronic brake system according to an embodiment of the present disclosure includes a plurality of power regulators to implement redundancy in supplying power to the internal sensor.

According to an embodiment of the present disclosure, the first ECU 110 may include power regulators 112 and 113 to supply constant power to the first internal sensor 211 and the second internal sensor 221, respectively, and the second ECU 120 may include power regulators 122 and 123 to supply constant power to the third internal sensor 212 and the fourth internal sensor 222, respectively. The power regulator of FIG. 4 is applied in the same manner as described with reference to FIG. 3.

According to an embodiment of the present disclosure, the electronic brake system of the present disclosure can be further stabilized by implementing redundancy of the power supply supplied to the internal sensor.

Figure 5:
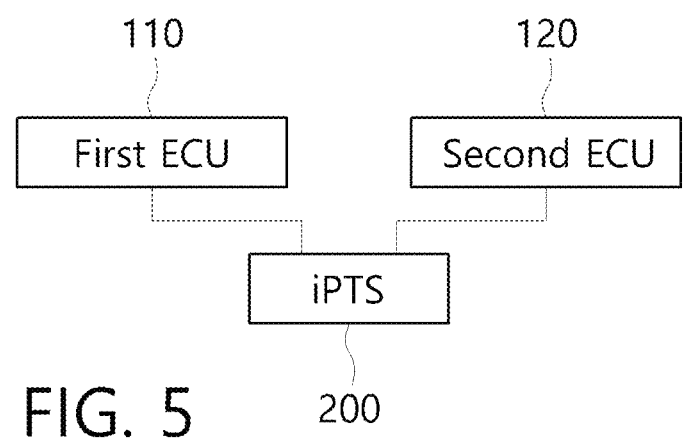
FIG. 5 is a diagram showing a specific configuration of an electronic brake system according to a third embodiment of the present disclosure.

FIG. 5 is a diagram showing a specific configuration of an electronic brake system according to a third embodiment of the present disclosure.

According to an embodiment of the present disclosure, a case in which the pedal travel sensor 200 is implemented as an internal pedal travel sensor (iPTS) is shown. According to an embodiment of the present disclosure, at least one of the first pedal travel sensor 210 and the second pedal travel sensor 220 may be an internal pedal travel sensor.

The internal pedal travel sensor includes two magnets and a pedal travel sensor disposed near the magnets. When the connected piston moves according to a pedal effort of the brake pedal 30, the magnet moves on the same axis as the piston, causing a change in magnetic force. The pedal travel sensor detects the change in magnetic force generated by the movement of the magnet.

According to an embodiment of the present disclosure, the pedal travel sensor 200 may be implemented on a PCB substrate different from those of the first ECU 110 and the second ECU 120, and may be disposed as shown in FIG. 5.

According to an embodiment of the present disclosure, the present disclosure may be applied not only to an external pedal travel sensor but also to an internal pedal travel sensor, and thus the present disclosure may be applied to the development trend of the electronic brake system.

What is claimed is:

1. An electronic brake system, comprising:
a first pedal travel sensor and a second pedal travel sensor, each comprising two internal sensors implemented as two separate circuits, with the two internal sensors having a common mechanism structure, and outputting a pair of pedal detection signal according to an operation of a brake pedal; and
a first ECU (Electronic Control Unit) and a second ECU connected to the first pedal travel sensor and the second pedal travel sensor and controlling an electronic parking brake according to the pair of pedal detection signals,
wherein the first ECU is configured to receive a first pair of pedal detection signals comprising a first pedal detection signal from a first internal sensor of the first pedal travel sensor and a second pedal detection signal from a second internal sensor of the second pedal travel sensor, and
the second ECU is configured to receive a second pair of pedal detection signals comprising a third pedal detection signal from a third internal sensor of the first pedal travel sensor and a fourth pedal detection signal from a fourth internal sensor of the second pedal travel sensor,
wherein a determination of an error in any one of the two internal sensors in the first pedal travel sensors is based solely on comparing the first pair of detection signals, and the determination of the error in any one of the two internal sensors in the second pedal travel sensors is based solely on comparing the second pair of detection signals.

2. The electronic brake system of claim 1,
wherein the first ECU further comprises:
at least one first regulator configured to supply a constant first power to the first internal sensor and the second internal sensor; and
a first MCU (Microcontroller Unit) configured to receive the first pedal detection signal and the second pedal detection signal respectively from the first internal sensor and the second internal sensor, wherein the second ECU further comprises:
at least one second regulator configured to supply a constant second power to the third internal sensor and the fourth internal sensor; and
a second MCU configured to receive the third pedal detection signal and the fourth pedal detection signal respectively from the third internal sensor and the fourth internal sensor.

3. The electronic brake system of claim 1, further comprising:
a plurality of motors connected to the first ECU and the second ECU and providing driving force to calipers,
wherein the first ECU is configured to control the plurality of motors by using the first pedal detection signal and the second pedal detection signal when an operation state of the first ECU is in an active state.

4. The electronic brake system of claim 3, wherein the second ECU is configured to control the plurality of motors by using the third pedal detection signal and the fourth pedal detection signal when an operation state of the first ECU is in an inactive state.

5. The electronic brake system of claim 4, wherein the second ECU is configured to receive information about the operation state of the first ECU from the first ECU and identify the operation state of the first ECU based on the information about the operation state of the first ECU.

6. The electronic brake system of claim 1, wherein the first ECU is configured to compare the first pedal detection signal and the second pedal detection signal to determine whether any one of the first internal sensor and the second internal sensor has the error when an operation state of the first ECU is in an active state.

7. The electronic brake system of claim 6, wherein the first ECU is configured to receive the third pedal detection signal and the fourth pedal detection signal from the second ECU to determine again whether there is the error, when the any one of the first internal sensor and the second internal sensor has the error.

8. The electronic brake system of claim 1, wherein the second ECU is configured to compare the third pedal detection signal and the fourth pedal detection signal to determine whether any one of the third internal sensor and the fourth internal sensor has the error when an operation state of the first ECU is in an inactive state.

9. The electronic brake system of claim 8, wherein when the any one of the third internal sensor and the fourth internal sensor has the error, the second ECU is configured to receive data from a wheel speed sensor to determine again whether there is the error.

10. The electronic brake system of claim 1, wherein at least one of the first pedal travel sensor and the second pedal travel sensor is an internal pedal travel sensor.

11. A method for controlling an electronic brake system, comprising:
receiving, by a first ECU (Electronic Control Unit), a first pair of pedal detection signals comprising a first pedal detection signal from a first internal sensor of a first pedal travel sensor and a second pedal detection signal from a second internal sensor of a second pedal travel sensor according to an operation of a brake pedal;
receiving, by a second ECU, a second pair of pedal detection signals comprising a third pedal detection signal from a third internal sensor of the first pedal travel sensor and a fourth pedal detection signal from a fourth internal sensor of the second pedal travel sensor according to the operation of the brake pedal; and determining, by the first ECU or the second ECU, an error in any one of the first and the second internal sensors based solely on comparing the first pair of detection signals, and determining the error in any one of the third and the fourth internal sensors based solely ort comparing the second pair of detection signals; and controlling, by the first ECU or the second ECU, a plurality of motors providing driving force to calipers, based on an operation state of the first ECU, wherein the first and the third internal sensors in the first pedal travel sensor are implemented as separate circuits and have a first common mechanism structure, and the second and the fourth internal sensors in the second pedal travel sensor are implemented as the separate circuits and have a second common mechanism structure.

12. The method for controlling an electronic brake system of claim 11, wherein the controlling the plurality of motors comprises:

receiving, by the second ECU, information about the operation state of the first ECU from the first ECU; and identifying, by the second ECU, the operation state of the first ECU based on the information about the operation state of the first ECU.

13. The method for controlling an electronic brake system of claim 11, wherein the first ECU further comprises:

at least one first regulator configured to supply a constant first power to the first internal sensor and the second internal sensor; and a first MCU (Microcontroller Unit) configured to receive the first pedal detection signal and the second pedal detection signal respectively from the first internal sensor and the second internal sensor, wherein the second ECU further comprises:

at least one second regulator configured to supply a constant second power to the third internal sensor and the fourth internal sensor; and a second MCU configured to receive the third pedal detection signal and the fourth pedal detection signal respectively from the third internal sensor and the fourth internal sensor.

14. The method for controlling an electronic brake system of claim 12, wherein the controlling the plurality of motors comprises: controlling, by the first ECU, the plurality of motors by using the first pedal detection signal and the second pedal detection signal when the operation state of the first ECU is in an active state.

15. The method for controlling an electronic brake system of claim 12, wherein the controlling the plurality of motors comprises: controlling, by the second ECU, the plurality of motors by using the third pedal detection signal and the fourth pedal detection signal when the operation state of the first ECU is in an inactive state.

16. The method for controlling an electronic brake system of claim 12, wherein the controlling the plurality of motors comprises: comparing, by the first ECU, the first pedal detection signal and the second pedal detection signal to determine whether any one of the first internal sensor and the second internal sensor has the error when the operation state of the first ECU is in the active state.

17. The method for controlling an electronic brake system of claim 16, further comprising:

receiving, by the first ECU, the third pedal detection signal and the fourth pedal detection signal from the second ECU to determine again whether there is the error when the any one of the first internal sensor and the second internal sensor has the error.

18. The method for controlling an electronic brake system of claim 15, comprising:

comparing, by the second ECU, the third pedal detection signal and the fourth pedal detection signal to determine whether any one of the third internal sensor and the fourth internal sensor has the error when the operation state of the first ECU is in the inactive state.

19. The method for controlling an electronic brake system of claim 11, wherein at least one of the first pedal travel sensor and the second pedal travel sensor is an internal pedal travel sensor.

20. A recording medium on which a computer readable program is stored, the program comprising a code for performing a method for controlling an electronic brake system, the method for controlling an electronic brake system comprising:

receiving, by a first ECU (Electronic Control Unit), a first pair of pedal detection signals comprising a first pedal detection signal from a first internal sensor of a first pedal travel sensor and a second pedal detection signal from a second internal sensor of a second pedal travel sensor according to an operation of a brake pedal;

receiving, by a second ECU, a second pair of pedal detection signals comprising a third pedal detection signal from a third internal sensor of the first pedal travel sensor and a fourth pedal detection signal from a fourth internal sensor of the second pedal travel sensor according to the operation of the brake pedal;

determining, by the first ECU or the second ECU, an error in any one of the first and the second internal sensors based solely on comparing the first pair of detection signals, and determining the error in any one of the third and the fourth internal sensors based solely on comparing the second pair of detection signals; and controlling, by the first ECU or the second ECU, a plurality of motors providing driving force to calipers, based on an operation state of the first ECU, wherein the first and the third internal sensors in the first pedal travel sensor are implemented as separate circuits and have a first common mechanism structure, and the second and the fourth internal sensors in the second pedal travel sensor are implemented as the separate circuits and have a second common mechanism structure.

* * * * *